(12) United States Patent
Luo et al.

(10) Patent No.: US 10,603,731 B2
(45) Date of Patent: Mar. 31, 2020

(54) METHOD AND APPARATUS FOR POLISHING METAL PARTS WITH COMPLEX GEOMETRIES

(71) Applicant: General Electric Company, Schenectady, NY (US)

(72) Inventors: Yuanfeng Luo, Rexford, NY (US); Steven Robert Hayashi, Niskayuna, NY (US); Adegboyega Masud Makinde, Niskayuna, NY (US); Andrew Lee Trimmer, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 968 days.

(21) Appl. No.: 14/952,370

(22) Filed: Nov. 25, 2015

(65) Prior Publication Data
US 2017/0144239 A1    May 25, 2017

(51) Int. Cl.
*B23H 5/08* (2006.01)
*B23H 9/10* (2006.01)
(Continued)

(52) U.S. Cl.
CPC ............... *B23H 5/08* (2013.01); *B23H 9/10* (2013.01); *B24B 31/06* (2013.01); *C25F 3/16* (2013.01); *C25F 7/00* (2013.01)

(58) Field of Classification Search
CPC .. B24B 31/00–16; C25F 3/16–28; C25F 7/00; B23H 5/06; B23H 5/08; B23H 5/12; B23H 9/10
(Continued)

(56) References Cited

U.S. PATENT DOCUMENTS 2,978,850 A * 4/1961 Gleszer ............... B22F 3/00
                                                    451/330
3,523,834 A * 8/1970 Hewins ............... B23H 5/06
                                                    148/254
(Continued)

FOREIGN PATENT DOCUMENTS

CH        353596 A  *  4/1961  ............... B08B 7/02
DE       2031833 A  * 12/1971  ............... B23H 5/06
(Continued)

OTHER PUBLICATIONS

Pierre A. Jacquet.,"Electrolytic and chemical polishing", Metallurgical Reviews, vol. 1, Issue: 1, pp. 157-238, Jan. 1, 1956.
(Continued)

*Primary Examiner* — Nicholas A Smith
(74) *Attorney, Agent, or Firm* — Ziolkowski Patent Solutions Group, SC; Jean K. Testa

(57) ABSTRACT

The polishing system includes a power supply. The polishing system also includes a container including an interior portion. The interior portion includes a conductive material thereon. The conductive material is electrically coupled to the power supply. The polishing system also includes an electrolytic solution disposed within the container. The electrolytic solution includes a plurality of abrasive particles. The polishing system further includes a flexible media disposed within the container. The container is configured to contain an object. The power supply configured to electrically couple to the object. Each of the electrolytic solution, the flexible media, and the abrasive particles is configured to partially polish the object substantially simultaneously.

20 Claims, 1 Drawing Sheet

Figure 1:
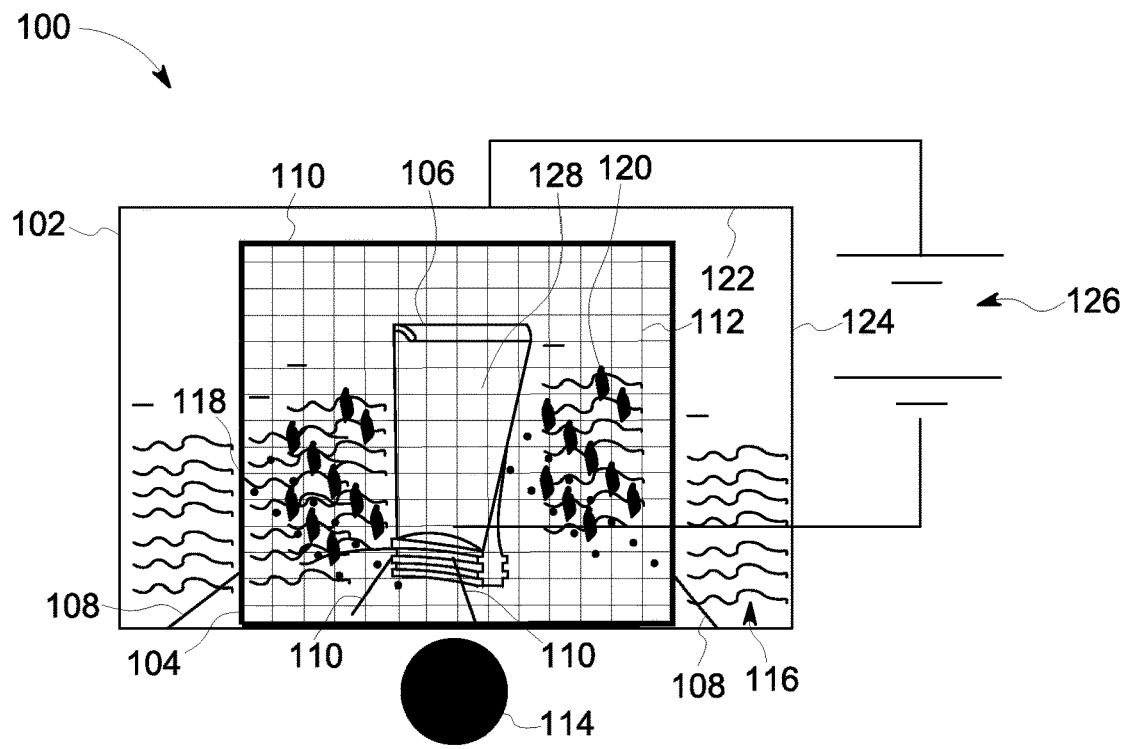

(51) Int. Cl.
*C25F 3/16* (2006.01)
*C25F 7/00* (2006.01)
*B24B 31/06* (2006.01)

(58) Field of Classification Search
USPC .................................................... 451/36–37
See application file for complete search history.

(56) References Cited

U.S. PATENT DOCUMENTS

| | | | | |
|---|---|---|---|---|
| 3,533,928 | A | * | 10/1970 | Inoue ...................... B23H 9/02 204/155 |
| 4,383,967 | A | * | 5/1983 | Balz ........................... B01J 2/22 264/224 |
| 4,512,859 | A | * | 4/1985 | Inoue .................... B24B 31/116 204/DIG. 12 |
| 4,975,335 | A | | 12/1990 | Wan |
| 6,074,284 | A | | 6/2000 | Tani et al. |
| 7,255,784 | B2 | | 8/2007 | Sato et al. |
| 8,052,860 | B1 | | 11/2011 | Engelhaupt et al. |
| 8,733,422 | B2 | | 5/2014 | Browning et al. |
| 2008/0029407 | A1 | * | 2/2008 | Bayer ....................... C25F 5/00 205/717 |
| 2013/0043135 | A1 | | 2/2013 | Demers et al. |

FOREIGN PATENT DOCUMENTS

| | | | |
|---|---|---|---|
| DE | 2031833 A1 | * 12/1971 | ............... B23H 5/06 |
| WO | 9958283 A1 | 11/1999 | |
| WO | 0136138 A1 | 5/2001 | |

OTHER PUBLICATIONS

Palmieri, V. "Fundamentals of Electrochemistry—The Electrolytic Polishing of Metals: Application to Copper and Niobium", Istituto Nazionale di Fisica Nucleare, Laboratori Nazionali di Legnaro, 9 pages.

Evaristo, A.E.B., "Characteristics of Material Removal by Ceramic Media on Metallic Coupons for Mass Finishing Applications," Dissertations (1962-2010) Access via Proquest Digital Dissertations, pp. 1-140 (Aug. 2001).

* cited by examiner

METHOD AND APPARATUS FOR POLISHING METAL PARTS WITH COMPLEX GEOMETRIES

BACKGROUND

The field of the disclosure relates generally to systems and methods for polishing metal parts with complex geometries and, more particularly, to a system and method for simultaneous mass finishing and electro-chemical polishing.

Metallic parts made by additive manufacturing and casting require polishing due to the rough surfaces additive manufacturing or casting create. At least some of the known methods for polishing metal parts are mass finishing and electro-chemical polishing. For example, some known mass finishing methods use a flexible media, such as chips or abrasives, to mechanically polish metal parts. Metal parts are placed in a container with flexible media or abrasive surrounding the parts. A vibration mechanism vibrates the container, metal part, and flexible media. The flexible media chips away rough portions of the metal part and produces a metal part with a smooth surface. Mass finishing requires long processing durations to complete a single part.

In addition, some known electro-chemical polishing methods use an electrical circuit, an electrolyte, abrasive particles, and/or a tool. Metal parts are submerged in a container with an electrolyte and abrasive particles. An electrical circuit is formed by connecting the metal part (anode) and the container (cathode) to a power supply. The electrolyte facilitates the flow of electrons from the metal part (anode) to the container (cathode) and completes the circuit. An oxidation reaction occurs between the electrolyte and the metal ions on the surface of the metal part. The oxidation reaction frees a metal ion from the surface of the metal part and frees electrons from the freed metal ions. The free electrons complete the electrical circuit. As metal ions are removed from the metal part surface, the surface becomes smooth. However, the oxidation reaction forms a passive oxide film that prevents unreacted electrolyte from reacting with the fresh surface of the metal part. A passive oxide film removal tool may be used to remove the passive oxide film and promote new oxidation reactions. Some known electro-chemical processes also use abrasive particle particles in the electrolyte in conjunction with a passive oxide film removal tool to promote new oxidation reactions. Electro-chemical polishing has a short processing time to complete a single part. However, because of the need to remove the passive oxide film, electro-chemical polishing is generally limited to polishing metal parts with simple geometries.

BRIEF DESCRIPTION

In one aspect, a polishing system is provided. The polishing system includes a power supply. The polishing system also includes a container including an interior portion. The interior portion includes a conductive material thereon. The conductive material is electrically coupled to the power supply. The polishing system also includes an electrolytic solution disposed within the container. The electrolytic solution includes a plurality of abrasive particles. The polishing system further includes a flexible media disposed within the container. The container is configured to contain an object. The power supply configured to electrically couple to the object. Each of the electrolytic solution, the flexible media, and the abrasive particles is configured to partially polish the object substantially simultaneously.

In another aspect, a method for polishing objects is provided. The method includes disposing an electrolytic solution within a container. The electrolytic solution includes a plurality of abrasive particles. The method further includes immersing an object in the electrolytic solution disposed within the container. The container includes a flexible media and an isolation mesh disposed therein. The method also includes coupling the object and at least a portion of the container to an electric power supply. The method further includes transmitting an electric current through the object and the at least a portion of the container. The method also includes vibrating the container and the flexible media for a predetermined period of time.

DRAWINGS

Figure 2:
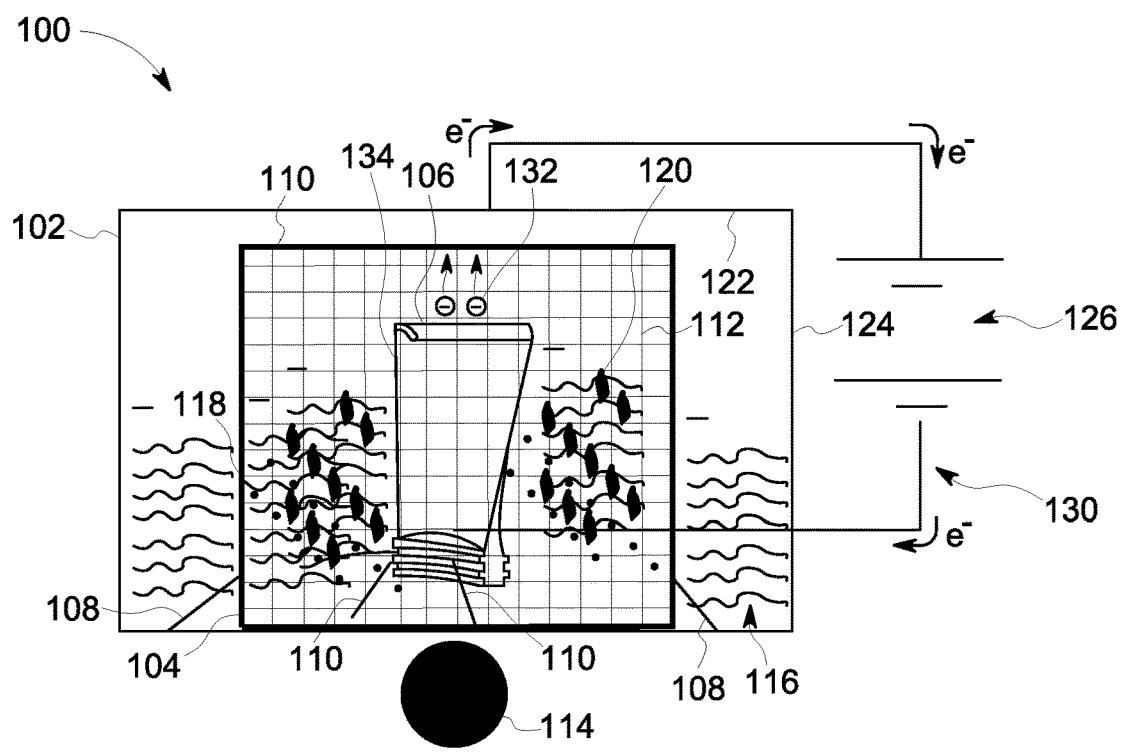

These and other features, aspects, and advantages of the present disclosure will become better understood when the following detailed description is read with reference to the accompanying drawings in which like characters represent like parts throughout the drawings, wherein:

FIG. 1 is a schematic view of an exemplary mass finishing and electro-chemical polishing unit, and FIG. 2 is a schematic view of the mass finishing and electro-chemical polishing unit shown in FIG. 1 with a completed electric circuit.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the mass finishing and electro-chemical polishing units described herein simultaneously mass finish and electrochemically polish an object, e.g., a metal part. The electro-chemical portion of the mass finishing and electro-chemical polishing unit includes a container that acts as a cathode, a metal part that acts as an anode, a power supply connected to the cathode and the anode, a electrolytic solution in the container, and abrasive particles suspended in the electrolytic solution. The power supply, metal part, electrolytic solution, and container form a complete electric circuit. The electric circuit and ions in the electrolytic solution drive an oxidation reaction that removes material from the surface of the metal part and polishes the metal part. Abrasive material in the electrolytic solution is pushed against the part by the media chips during vibration. The media chips work as a flexible tool to hold abrasive materials and generate an envelope of a complex part. Abrasive material removes an oxide film that forms on the surface of the metal part and enables the oxidation reaction to proceed. The mass finishing portion of the mass finishing and electro-chemical polishing unit includes a container that contains the object, e.g. metal part, and media chips and a vibrator that vibrates the container. As the vibrator vibrates the container, the media chips contact the metal part. Each contact removes material from the surface of the metal part, polishing the metal part through the abrasive materials.

The mass finishing and electro-chemical polishing unit described herein offers advantages over known methods of polishing objects. More specifically, the mass finishing and electro-chemical polishing unit described herein facilitates simultaneous mass finishing and electro-chemical polishing. Simultaneous mass finishing and electro-chemical polishing simplifies the electro-chemical polishing process by using abrasive particles and media chips to remove oxide films rather than a separate tool. Simultaneous mass finishing and electro-chemical polishing polishes metal parts with complex geometries faster than mass finishing or electro-chemical polishing alone. Furthermore, simultaneous mass finishing and electro-chemical polishing polishes metal parts with non-complex geometries faster than mass finishing or electro-chemical polishing alone.

FIG. 1 is a schematic view of an exemplary mass finishing and electro-chemical polishing unit 100. In the exemplary embodiment, mass finishing and electro-chemical polishing unit 100 includes a container 102 and an isolation mesh 104 disposed within container 102. A metal part 106 is disposed within isolation mesh 104. Container structural members 108 are fixedly coupled to, and support, isolation mesh 104 and metal part 106. Isolation mesh 104 includes isolation mesh structural members 110 and mesh 112. Isolation mesh structural members 110 are fixedly coupled to, and support, metal part 106 and maintain the structure of isolation mesh 104. Mesh 112 is fixedly coupled to isolation mesh structural members 110 and at least partially encases metal part 106. In the exemplary embodiment, mesh 112 is a wire mesh. A vibrator 114 is fixedly coupled to container 102. Container 102 at least partially encases isolation mesh 104 and metal part 106.

An electrolytic solution 116 is disposed within container 102 and is in flow communication with metal part 106 through mesh 112. In the exemplary embodiment, electrolytic solution 116 is a 20% solution of sodium nitrate. In alternative embodiments, electrolytic solution 116 also includes any other suitable electrolyte in any suitable concentration that enable operation of unit 100 as described herein. A plurality of abrasive particles 118 are suspended in solution within electrolytic solution 116. In the exemplary embodiment, abrasive particles 118 include aluminum oxide particles. In alternative embodiments, abrasive particles 118 also include diamond powder or any other suitable abrasive particles that enable operation of unit 100 as described herein. A flexible media 120 is disposed within isolation mesh 104. In the exemplary embodiment, flexible media 120 includes copper chips too large to be suspended in solution within electrolytic solution 116. In alternative embodiments, flexible media 120 also includes any metallic chip material suitable for mass finishing that enable operation of unit 100 as described herein.

A conductive material 122 is disposed on an inner surface 124 of container 102 and electrically coupled to a power supply 126. In the exemplary embodiment, power supply 126 is a battery. Power supply 126 is electrically coupled to metal part 106. Mesh 112 is a mesh screen material or sieve material sized to isolate abrasive particles 118 and flexible media 120 from conductive material 122 and to facilitate electrolytic solution 116 to remain in flow communication with conductive material 122 and metal part 106. Abrasive particles 118 and flexible media 120 are isolated from conductive material 122 to prevent them from completing a circuit with conductive material 122 and metal part 106.

During operation, vibrator 114 vibrates container 102. Container structural members 108 support isolation mesh 104. Conductive material 122 conducts electricity from power supply 126. Isolation mesh structural members 110 supports metal part 106 conducts electricity from power supply 126. Container 102 contains a volume of electrolytic solution 116 that at least partially covers metal part 106. Isolation mesh 104 contains a volume of abrasive particles 118 and flexible media 120 that at least partially covers metal part 106.

Vibrations from vibrator 114 induce contact of flexible media 120 with a surface 128 of metal part 106. Flexible media 120 impacts polish surface 128 of metal part 106 and removes microscopic particles from surface 128 of metal part 106. Flexible media 120 also surrounds metal part 106. The frequency of vibration of vibrator 114 is dependent on the material of metal part 106, material of flexible media 120, and the speed of the electro-chemical polishing process. Typical values of frequency of vibration range from approximately 10 hertz (Hz) to approximately 100 Hz. In the exemplary embodiment, the frequency of vibration of vibrator 114 is 40 Hz. However, the exemplary embodiment of this disclosure is not limited to frequencies of vibration between approximately 10 Hz and approximately 100 Hz. Vibrating flexible media 120 conform to curves and folds in metal parts 106 with complex geometries, enabling polishing within the complex geometries.

FIG. 2 is a schematic view of an exemplary mass finishing and electro-chemical polishing unit 100 with a completed electric circuit 130. Electrolytic solution 116 completes electric circuit 130 between conductive material 122 (cathode) and metal part 106 (anode). Electric circuit 130 drives an oxidation reaction between ions in electrolytic solution 116 and metal ions on surface 128 of metal part 106. The oxidation reactions are anodic reactions because the reactions produce free electrons in electrolytic solution 116. The free electrons produced from the oxidation reaction produce a plurality of negatively charged ions 132 within electrolytic solution 116, complete electric circuit 130, and drive new oxidation reactions on surface 128 of metal part 106.

Depending on the material of metal part 106, the composition of electrolytic solution 116, and the value of the current through electric circuit 130, an oxide film 134 may develop on surface 128 of metal part 106. Oxide film 134 prevents the oxidation reaction from proceeding by preventing metal ions from dissolving into electrolytic solution 116, electrolytic solution 116 from accessing newly exposed metal ions, and free electrons from completing electrical circuit 130. Abrasive particles 118 and flexible media 120 contact metal part 106 and remove oxide film 134 that may form as a result of the oxidation reaction. Flexible media 120 pushes abrasive particles 118 into the surface 128 of metal part 106, acting as a flexible tool and facilitating the removal of oxide film 134. Flexible media 120 combined with abrasive particles 118 conform to curves and folds in metal parts 106 with complex geometries, thereby facilitating oxide film 134 removal within the complex geometries.

In an alternative embodiment, conductive material 122 is disposed within an interior portion of container 102 immersed within electrolytic solution 116, but outside of isolation mesh 104. In another alternative embodiment, conductive material 122 is disposed in any interior portion of container 102 that enables operation of unit 100 as described herein. Interior portions of container 102 include, without limitation, an inner surface 124 of container 102. Further interior portions of contain 102 include, without limitation, an interior portion of container 102 immersed within electrolytic solution 116, but outside of isolation mesh 104.

Enhanced results, in terms of metal part 106 smoothness, are achieved when the speed of the electro-chemical process is moderated to track with the speed of the slower mass finishing process. The speed of the electro-chemical process is controlled by controlling the current applied to the circuit. The current applied to electric circuit 130 is dependent on material of metal part 106, composition of electrolytic solution 116, surface area of surface 128 of metal part 106, and material of flexible media 120. If the current is too high, the electro-chemical polishing process will proceed faster than the mass finishing process which may induce pitting on surface 128 of metal part 106. If the current is too low, the electro-chemical process will not proceed fast enough and time savings over the mass finishing process will not be realized. Typical values for the current applied are approximately 1 ampere (A) to approximately 4 A. However, the exemplary embodiment of this disclosure is not limited to approximately 1 A to approximately 4 A. In alternative embodiments, power supply 126 may include a current modulator to modulate the current and ensure the electro-chemical process proceeds at an optimum speed.

The above-described mass finishing and electro-chemical polishing unit provides an efficient method for polishing a metal part. Specifically, mass finishing and electro-chemical polishing unit polishes metal parts with electro-chemical polishing and mass finishing. Combining electro-chemical polishing with mass finishing simplifies the elector-chemical process by removing the need for a separate tool that remove the oxide film. Additionally, the combination of electro-chemical polishing and mass finishing polishes metal parts faster than either process accomplished acting alone. Finally, the combination of electro-chemical polishing and mass finishing polishes metal parts with complex geometries significantly faster than mass finishing accomplished without electro-chemical polishing.

An exemplary technical effect of the methods, systems, and apparatus described herein includes at least one of: (a) decreasing the processing time required to polish metal parts; (b) decreasing the processing time to polish metal parts with complex geometries; and (c) decreasing the complexity of the electro-chemical polishing system by removing the need for a separate tool that removes an oxide film.

Exemplary embodiments of the mass finishing and electro-chemical polishing unit are described above in detail. The mass finishing and electro-chemical polishing units, and methods of operating such units and devices are not limited to the specific embodiments described herein, but rather, components of systems and/or steps of the methods may be utilized independently and separately from other components and/or steps described herein. For example, the methods may also be used in combination with other systems for polishing metal parts, and are not limited to practice with only the systems and methods as described herein. Rather, the exemplary embodiment may be implemented and utilized in connection with many other machinery applications that polish metal parts.

Example methods and apparatus for mass finishing and electro-chemical polishing are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polishing system comprising:
    a power supply;
    a container comprising an interior portion comprising a conductive material thereon, said conductive material electrically coupled to said power supply;
    an electrolytic solution disposed within said container and comprising a plurality of abrasive particles;
    a flexible media disposed within said container, wherein said container is configured to contain an object, said power supply configured to electrically couple to the object, each of said electrolytic solution, said flexible media, and said abrasive particles configured to partially polish the object substantially simultaneously; and
    an isolation mesh disposed within said container, said isolation mesh sized to isolate said flexible media and said abrasive particles from said conductive material.

2. The polishing system in accordance with claim 1, wherein said flexible media comprise copper chips.

3. The polishing system in accordance with claim 1, wherein said abrasive particles comprise aluminum oxide particles.

4. The polishing system in accordance with claim 1, wherein said abrasive particles comprise diamond powder.

5. The polishing system in accordance with claim 1, wherein said power supply comprises a battery.

6. The polishing system in accordance with claim 1 further comprising a vibrator coupled to said container.

7. The polishing system in accordance with claim 1, wherein said electrolytic solution comprises a solution of sodium nitrate.

8. The polishing system in accordance with claim 6, wherein said vibrator is configured to vibrate at a frequency of vibration within a range from about 10 Hz to about 100 Hz.

9. The polishing system in accordance with claim 1, wherein said power supply comprises a current modulator.

10. A method for polishing objects, said method comprising:
- disposing an electrolytic solution within a container, the electrolytic solution including a plurality of abrasive particles;
- immersing an object in the electrolytic solution disposed within the container, wherein the container includes a flexible media and an isolation mesh disposed therein, said isolation mesh sized to isolate said flexible media and said plurality of abrasive particles from said container;
- coupling the object and at least a portion of the container to an electric power supply;
- transmitting an electric current through the object and the at least a portion of the container; and
- vibrating the container and the flexible media for a predetermined period of time.

11. The method in accordance with claim 10, wherein vibrating the container and flexible media comprises impacting the object with copper chips.

12. The method in accordance with claim 10, wherein disposing an electrolytic solution within a container comprises disposing the electrolytic solution including aluminum oxide particles within the container.

13. The method in accordance with claim 10, wherein disposing an electrolytic solution within a container comprises disposing the electrolytic solution including diamond powder within the container.

14. The method in accordance with claim 10, wherein immersing an object in the electrolytic solution comprises immersing a metal part in the electrolytic solution.

15. The method in accordance with claim 10, wherein vibrating the container comprises vibrating the container at a frequency within a range from and including vibration of about 10 Hz to and including about 100 Hz.

16. The method in accordance with claim 10, wherein disposing an electrolytic solution within a container comprises disposing a solution of sodium nitrate in a container.

17. The method in accordance with claim 10, wherein immersing an object in the electrolytic solution disposed within the container comprises immersing a wire mesh in the electrolytic solution disposed within the container.

18. The method in accordance with claim 10, wherein coupling the object and at least a portion of the container to an electric power supply comprises coupling the object and at least a portion of the container to a battery.

19. The method in accordance with claim 10, wherein coupling the object and at least a portion of the container to an electric power supply comprises coupling the object and at least a portion of the container to an electric power supply and a current modulator.

20. The method in accordance with claim 10, wherein said container comprises an interior portion having a conductive material thereon coupled to said electric power supply; and
- wherein said isolation mesh is configured to isolate said flexible media and said plurality of abrasive particles from said conductive material.

* * * * *